No. 788,710. PATENTED MAY 2, 1905.
P. E. DOOLITTLE.
VEHICLE TIRE.
APPLICATION FILED JAN. 22, 1904.
2 SHEETS—SHEET 1.
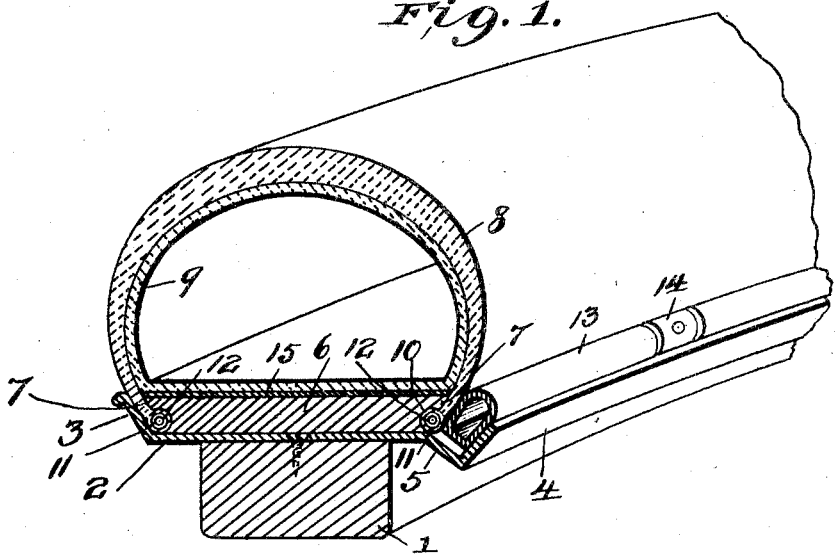
Fig. 1.
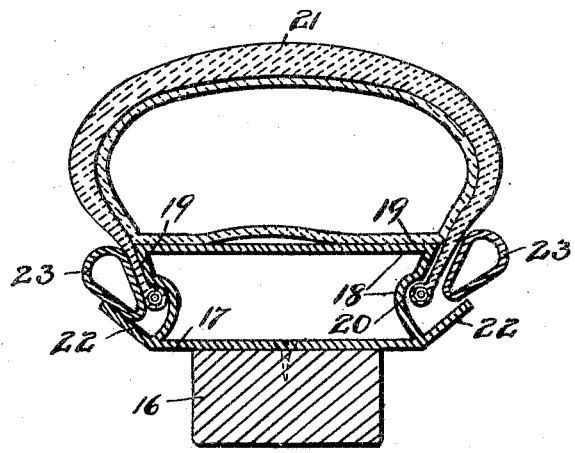
Fig. 2.
Fig. 3.
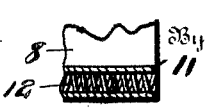
Witnesses
Jas. H. Blackwood
Warren G. Ogden
Inventor
Perry E. Doolittle
By W. H. Darlington
Attorneys No. 788,710. PATENTED MAY 2, 1905.
P. E. DOOLITTLE.
VEHICLE TIRE.
APPLICATION FILED JAN. 22, 1904.

2 SHEETS—SHEET 2.

No. 788,710.                                             Patented May 2, 1905.

UNITED STATES PATENT OFFICE.

PERRY E. DOOLITTLE, OF TORONTO, CANADA.

VEHICLE-TIRE.

SPECIFICATION forming part of Letters Patent No. 788,710, dated May 2, 1905.

Application filed January 22, 1904. Serial No. 190,220.

*To all whom it may concern:*

Be it known that I, PERRY E. DOOLITTLE, a subject of the King of Great Britain, residing at Toronto, in the Province of Ontario and Dominion of Canada, have invented certain new and useful Improvements in Vehicle-Tires, of which the following is a specification.

My invention relates to tires for vehicles; and its object is to provide simple and effective fastening means for detachably securing the tire to the rim or felly, these means being of such character that in respect to pneumatic tires they will clamp the tire to the rim independently of the expansive part of the tire, whereby the tire will be locked to the rim even when the tire is deflated, such clamping action being obtained between an expansible member and a base-section adapted to receive and support the elastic part of the tire and to form a bed to receive the tire when the latter is deflated, such base-section being independent of the tire, whereby economy of tire material is effected and a shallow tire enabled to be employed.

To these ends my invention is preferably embodied in the device hereinafter described, and illustrated by the accompanying drawings.

Figure 4:
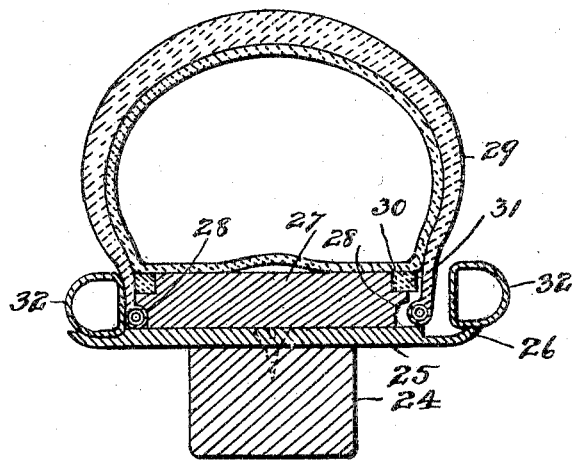
Figure 5:
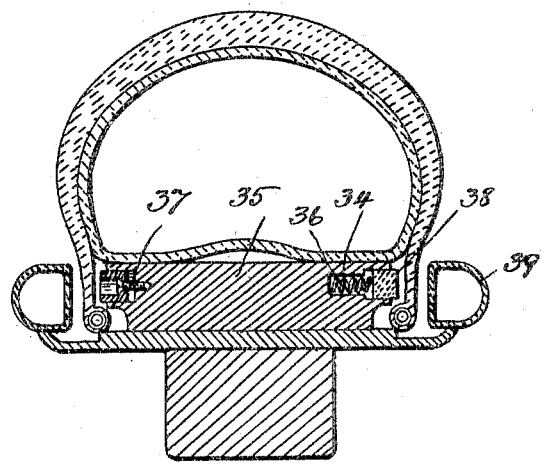
Figure 6:
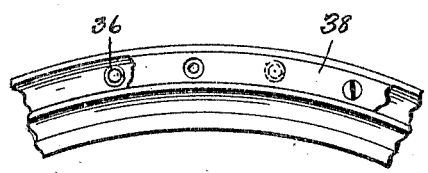

In the drawings, Figure 1 is a perspective view, in transverse section, of one form of my invention; Fig. 2, a sectional view of a modified form and also showing the inner tube deflated and showing a clamping-band loosened and the outer tire casing or tube partly taken away; Fig. 3, a detail longitudinal section of binding-wire in the edge of the tire; Figs. 4 and 5, views, similar to Fig. 2, of other modified forms of the device; and Fig. 6, a side view, broken away, of part of the clamping means of Fig. 5.

Referring first to Fig. 1 of the drawings, 1 designates the ordinary felly of a wheel, and 2 a metal channeled rim. In some wheels—such, for instance, as are used on some bicycles and sulkies and light carriages—a rim attached directly to the spokes is employed and performs the function of both a felly and a tire-receiving rim, and as it is possible that my invention may be practically applicable to such a construction it is to be understood that where in the claims herein the "rim" or the "felly" is claimed alone such term applies to and includes such construction. In the form of device shown in Fig. 1 one side 3 of the metal rim 2 is turned upwardly and outwardly in the usual manner. The outer side or flange 4 is preferably inclined outwardly at a somewhat greater angle than the side 3 and connects with a downwardly-inclined flange 5, extending from the flat face of the rim, and thereby forming a channel between the side flange and the tire. On the rim 2 is mounted a continuous inexpansible annular ring 6, forming a base-section for the tire. This base-section may be of any suitable material and is preferably of wood or some light metal. The base-section 6 is of a thickness to form upwardly-extending inclined side faces 7, adapted to receive the depending side flaps of the outer casing 8 of the tire and to project into the casing sufficiently to so support the inner air-tube 9 of the tire as to prevent chafing and cutting contact of the tire upon the side flange of the rim, either when inflated or deflated, and especially in the latter instance. To this end the base preferably extends to at least level with the top edges of the flange or above the same, although the degree of projection is not material, provided the result of thus supporting the tube is obtained. In the form shown in Fig. 1 the base section or ring is independent of and removable from both the rim and tire. The side faces of the base-ring are each provided with an annular recess 10, into which are adapted to fit the rolled or beaded edges 11 of the outer casing of the tire. This roll or bead is provided with a filler, preferably formed of a twisted or spirally-wound wire 12, (shown in detail in Fig. 3,) and which may be used in all the forms of the invention illustrated in the drawings. In the channel or groove formed by the flanges 4 and 5 is placed an expansible and contractible clamping member, consisting, preferably, of a split band 13, which may be of tubular formation, as shown. The ends of the band are joined by a turnbuckle 14 or similar means, which serves to expand and contract the band. The band 13 is wedge-shaped in cross-section in order to have a wedging action against the tire-casing between the flange 4 of the rim and the face 7 of the base member 6. The depth of the channel between the flanges 4 and 5 permits of the contraction of the band without limitation of its binding action against the tire by contact with the rim. When the band 13 is tightened by screwing up the turnbuckle, it will be contracted and forced down into its channel, and its wedge form will force it laterally against the depending flap of the outer casing 8 and bind said flap against the base-ring and also force the base-ring over against the flap on the opposite side, so as to bind the same between the flange 3 of the rim and the base-ring. The clamping strength of the band 13 may be made of a predetermined degree just sufficient to hold the tire to the rim and prevent creeping thereof when the tire is deflated, as the pressure of the tire will usually be sufficient, under inflation, to prevent creeping and loosening of the tire. Should the tire become deflated, the inner tube will rest upon the upper surface of the base member and the tire will be supported and ride thereon. The face of the base member is provided with a covering 15, of leather or rubber, and which may be of such material and thickness and resiliency as to form a yielding cushion or bed on which the tire will ride when deflated and which will therefore form practically a cushion-tire when the pneumatic tube is punctured.

In Fig. 2 there is shown a modified form of the invention in which a felly 16 and flanged rim 17 are employed, and an annular base member 18 is made integral with the rim. This base 18 is preferably hollow for the sake of lightness. It is provided with inclined side faces 19, which have recesses 20, adapted to receive the rolled or beaded edges of the flaps of the outer casing 21 of the tire. The rim is provided with inclined upwardly-extending side flanges 22, which, together with the side faces 19, form channels to receive the tire-clamping member. In the construction shown in this figure since the base-section forms part of the rim a detachable clamping member must be employed on each side of the rim. An annular band 23, split and provided with a turnbuckle, as in the form of Fig. 1, is placed on each side of wheel in the channel aforesaid. These bands are wedge-shaped in cross-section and when tightened they clamp the flaps of the outer casing of the tire against the side walls of the base member, and thereby securely lock the tire to the rim.

In both Figs. 1 and 2 the tire is clamped between two rigid unyielding bodies, and the clamping action is effected solely by the wedging due to the contraction of the spring-band.

In Fig. 4 there is shown a form of device in which the tire is applied to a shallow rim having a very slight upturning of the side flanges. 24 is the felly, 25 the rim, and 26 the slightly-upturned side flanges of the rim.

In this form it is unnecessary to leave a space in the channel or groove in which the clamping member fits, so as to prevent limitation of the wedging action of the clamp, as a coöperating clamping-surface of a yielding character is employed. The base 27 is made in a part separate from the rim 25, although it may be attached thereto, and is provided with side recesses 28 for the beaded edges of the tire-casing 29, as in the other forms, and it is also provided with recesses 30, adapted to receive annular rubber rings 31, the faces of which are adapted to project beyond the faces of the base member, so that they will offer a yielding resistance to the clamping member. The clamping members in this form consist of D-shaped annular contractible and expansible bands 32, which are adapted to coöperate with the upturned edge of rim to obtain a wedging action against the tire-casing when the bands are tightened, the rubber buffer-rings 31 forming a yielding counter-surface to the pressure of the bands, so as to prevent undue limitation of the clamping action, and thus perform the function of the grooves or channels in the previously-described forms. These interposed yielding rubber faces may be formed in various ways or attached to either contacting part.

In Fig. 5, in connection with the felly, rim, and tire and with the clamping-bands, there are shown lodged in recesses 34, located at intervals around the base member 35, cushioning-springs 36, which may be of any desired construction and which are held in the recesses by screws 37. Loosely mounted on the heads of these screws and bearing against the springs 36 are annular bands 38. These bands coöperate with the springs 36 to effect the same function as the rubber rings of Fig. 4—that is, to offer a yielding resistance to the clamping action of the detachable clamping-band. In this figure, 39 represents the clamping-bands, and they are of the same form and have the same operation as those of Fig. 4.

In Figs. 2, 4, and 5 one flap of the tire-casing and one of the clamping-bands are shown loosened from the rim in order to show the mode of attaching and removing the tire.

In Figs. 4 and 5, respectively, the base members 27 and 35 are preferably of wood and separate from the rim.

In all these forms of embodiment of the invention the annular section 6 18 35 forms a base for the tire adapted to receive the inner tube and to serve as a buffer or cushion for the tire if deflated. While being independent of the tire, it can be made much more economically than a cushion or buffer, forming part of the tire. It also serves to provide means to tightly secure the tire to the rim independently of the tire's expansive force by providing a surface coöperating with a non-expansible part of the tire, against which surface the tire may be rigidly clamped. The base member also stiffens the side walls by affording a long clamping-surface and protecting the tire at the bending-point.

It is clear that various changes in the embodiment of my invention may be made without departing from the scope thereof.

Having thus described my invention, what I claim is—

1. In combination with a rim, a pneumatic tire and a base member independent of said rim and tire, said tire having an expansive part and an inexpansible part, said base member adapted to project within the inexpansible part and entirely fill the space between the expansive part and said inexpansible part, whereby it serves as a tread-buffer when the tire is deflated, and having side faces against which the inexpansible part of the tire is adapted to be clamped and a circumferential expansive band for locking said tire against the face of the base member, substantially as described.

2. In a tire-fastening means, in combination with a rim, a pneumatic tire, said tire having an expansive part and an inexpansible part, a raised base member between the rim and expansive part of the tire and independent of said parts, said rim having an upturned flange, a circumferential expansible band adapted to extend between said flange and the inexpansible part of the tire to press the latter against the face of the base member, said band being wedge-shaped in cross-section and having a flat face which bears against the tire, substantially as described.

3. In a tire-fastening means, in combination with a tire, a rim, an expansible tire-locking band, means to force said band laterally against the tire upon contraction of the band, and resilient cushioning means to receive the pressure of said tire and band, substantially as described.

4. In a tire-fastening means, in combination with a rim having a flange, a pneumatic tire, a tire-base on the rim, independent of the tire, said base adapted to receive the inner expansible part of the tire, said tire having a part extending in over the side of the base, a wedge-shaped expansible locking-band for the tire between said flange and base, and resilient cushioning means between band and base, substantially as described.

In testimony whereof I have signed my name to this specification, in the presence of two subscribing witnesses, this 22d day of January, 1904.

PERRY E. DOOLITTLE.

Witnesses:
H. P. DOOLITTLE,
JAS. H. BLACKWOOD.